May 30, 1961

B. STORSAND 2,986,679

RECTIFIER UNIT

Filed Jan. 23, 1959

INVENTOR:
BJARNE STORSAND by Frederick Breitenfeld
Attorney

United States Patent Office 2,986,679

Patented May 30, 1961

2,986,679

RECTIFIER UNIT

Bjarne Storsand, Watt, Switzerland, assignor to Oerlikon Engineering Company, Zurich, Switzerland, a corporation of Switzerland Filed Jan. 23, 1959, Ser. No. 788,533

Claims priority, application Switzerland Jan. 30, 1958

7 Claims. (Cl. 317—234)

The present invention concerns a rectifying unit consisting of air-cooled semi-conductor rectifying elements.

Figure 1:
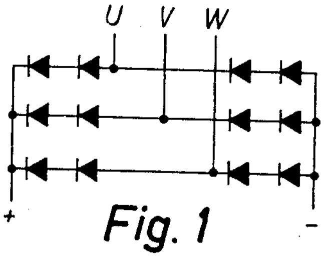
Figures 2, 4:
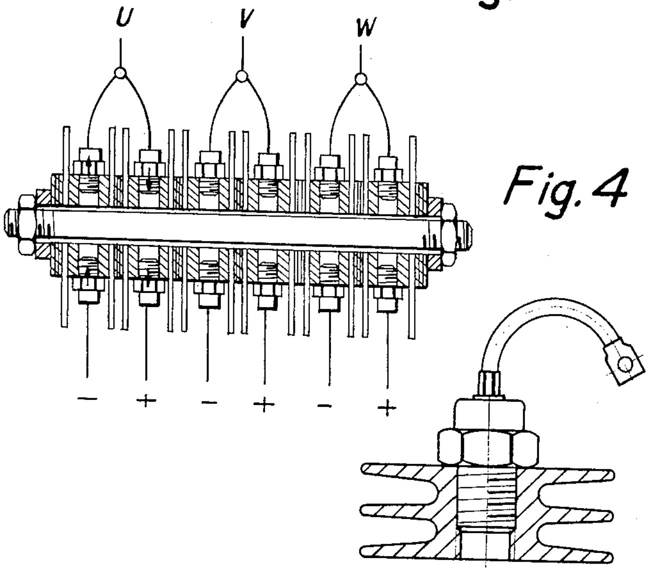
Figure 1A:
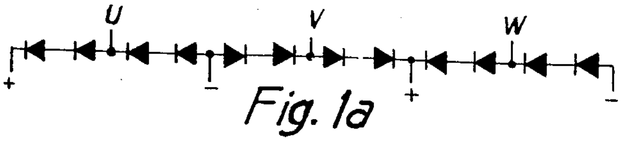

It is usual to associate semi-conductor rectifying elements with cooling plates in order to facilitate the dissipation of heat. A number of such parts can then be united into groups and built into the cooling air current. Fig. 1 of the enclosed drawing shows the circuit diagram of a three-phase full-wave Grätz rectifier circuit. The six valve circuits contain each two rectifying elements in series connection. Fig. 1*a* shows the same circuit in so-called "stretched arrangement" as used in dry-plate rectifiers. It might be useful to provide the cooling bodies of rectifying elements with cooling flanges, to improve heat flow. Fig. 2 shows such an arrangement. The assembly of such elements, however, requires much space and is expensive, and the full utilization of the cooling air current is rather difficult.

A relatively small dimensioned rectifier unit with good cooling features can be made up if the rectifying elements, according to the invention, are screwed to cooling blocks with plane parallel lateral faces and if the blocks are pressed together to form a unit with intermediate layers of cooling discs protruding beyond the cooling blocks and with insulating discs in positions, which correspond to the nature of the circuit. The unit can be held together by a suitably insulated tension bolt extending through the cooling blocks, cooling discs and insulating discs.

Figure 3:
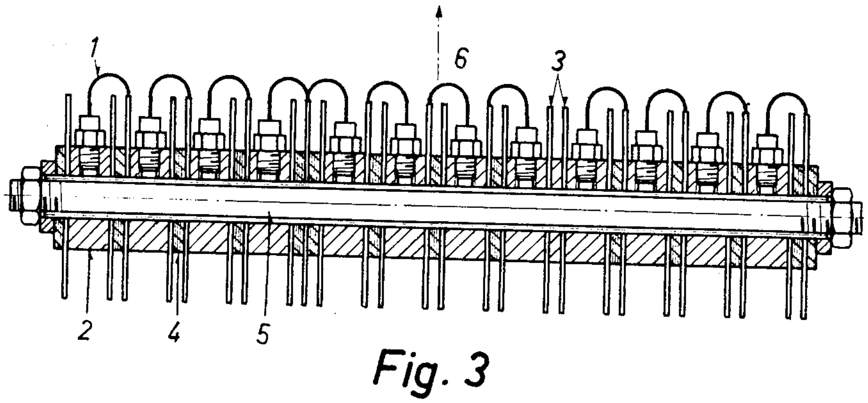

Fig. 3 shows the simplified nature of the invention by way of example. The semi-conductor elements are designated 1, the cooling blocks 2, the cooling discs 3, the insulating intermediate layers 4; and 5 is a tension bolt. The direction of the cooling air current is indicated by arrow 6. Owing to the good heat conduction within the cooling blocks and due to the distribution of the heat upon the adjacent cooling plates or discs, the arrangement allows the use of relatively thin and light plates without any risk of heat accumulation. While the cooling blocks are preferably made of copper with silver plated contact points, the cooling plates may consist of aluminum sheets. To enhance the cooling effect, several cooling discs can be provided on either side of the cooling blocks. It will be advantageous, besides, if, according to further features of the invention, an organic adhesive medium is provided between the cooling blocks and the adjacent cooling discs. This adhesive medium, e.g. of synthetic resin, does not serve to fasten the cooling discs to the cooling blocks, but serves to eliminate the normally existing layers of air. Since the thin layers of the adhesive medium present a considerably lower heat resistance than the air gap, the dissipation of heat can be essentially improved in a very simple manner.

If rectifying elements are used which in one case allow passage of current from the cable connection to the threaded socket in the cooling block and in another case from the threaded socket to the cable connection, two elements with opposite current flow direction can be screwed to each cooling block as shown in Fig. 4.

Having now particularly described and ascertained the nature of my said invention and in what manner the same is to be performed, what I claim is:

1. An air-cooled rectifier assembly comprising a plurality of annular units arranged in axial alignment, each unit consisting of a flat-faced block of good heat conductivity sandwiched between a pair of flat-faced discs of greater diameter and also of good heat conductivity, a plurality of semi-conductor rectifiers secured to the peripheries of said blocks in conductive relation thereto, there being at least one rectifier for each block, annular insulating spacers between said units in axial alignment therewith, and means extending in insulated relation axially through said units and spacers for holding them in pressed together alignment.

2. A rectifier assembly as defined in claim 1, said last-named means comprising a bolt enclosed within an insulating sleeve.

3. A rectifier assembly as defined in claim 1, said blocks and discs being metallic.

4. A rectifier assembly as defined in claim 1, said blocks being each composed of copper having its flat faces silver-coated.

5. A rectifier assembly as defined in claim 1, said blocks being each composed of copper having its flat faces silver-coated, said discs being composed of aluminum.

6. A rectifier assembly as defined in claim 1, including an adhesive medium between each block and its adjacent discs, said medium having a heat conductivity better than that of air.

7. A rectifier assembly as defined in claim 1, there being two rectifiers secured to each block and having opposite rectifying qualities so that current will flow into said block through one of them and out through the other.

References Cited in the file of this patent

FOREIGN PATENTS 892,190 Germany -------------- Oct. 5, 1953